June 10, 1924.  1,497,244
P. C. MATTOX
BOLL WEEVIL EXTERMINATOR
Filed Aug. 7, 1922
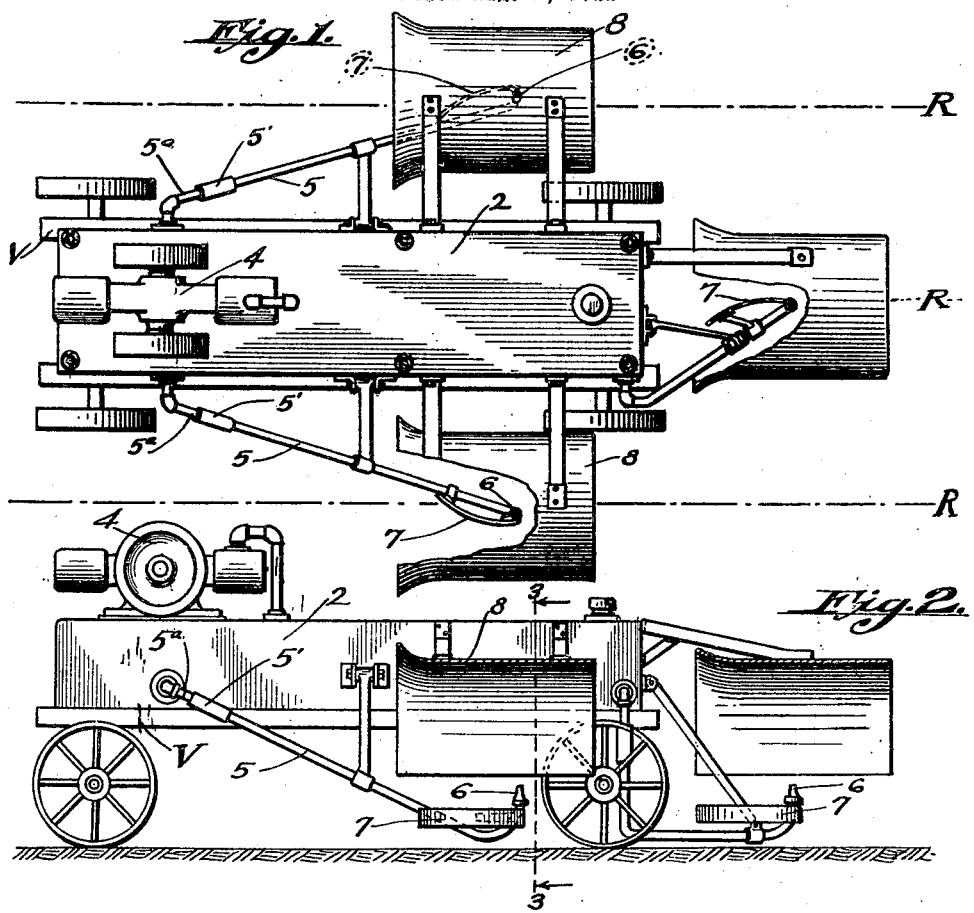
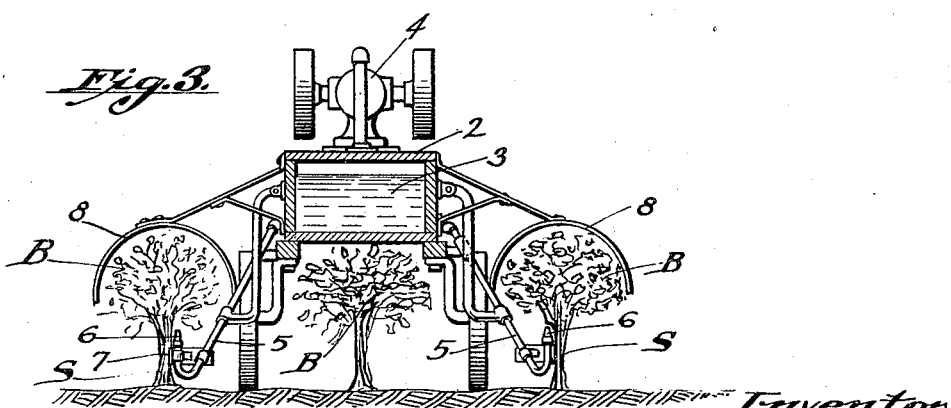
Inventor
PINKNEY C. MATTOX.
By Hazard & Miller
Attorneys.

Patented June 10, 1924.

1,497,244

UNITED STATES PATENT OFFICE.

PINKNEY C. MATTOX, OF LOS ANGELES, CALIFORNIA.

BOLL-WEEVIL EXTERMINATOR.

Application filed August 7, 1922. Serial No. 580,235.

*To all whom it may concern:*

Be it known that I, PINKNEY C. MATTOX, a citizen of the United States, residing at Los Angeles, in the county of Los Angeles and State of California, have invented new and useful Improvements in Boll-Weevil Exterminators, of which the following is a specification.

This invention relates to boll weevil exterminators and has for its object to provide a machine whereby cotton growing bushes may be effectively treated for the exterminating of insects and more particularly for the eradication of boll weevils.

As is well known, the boll weevil is generally found on the lower sides of the leaves and other parts of the growing cotton plant and attempts to exterminate this pest by means of sprays directed downwardly have proven ineffective.

An important object of my invention is to provide means for effectively enclosing the plants successively along a row in a fog of suitable insecticide, and more particularly an object is to provide for the application of the stream or spray producing the fog, upwardly from below the leaves and branches.

An embodiment of the invention is described in the following specification and illustrated in the accompanying drawing, in which—

Fig. 1 is a plan of the device, parts being broken away.

Fig. 2 is a side elevation and partial section.

Fig. 3 is a transverse section on line 3—3 of Fig. 2.

The invention is shown as embodied in an apparatus including a suitable tank 2 adapted to contain a liquid insecticide indicated at 3. There is provided means such as a pump 4 for creating air pressure in the tank 2 upon the liquid so that this latter may be forcibly sprayed or discharged through suitable nozzles. Preferably, the insecticide is discharged through nozzles which are so disposed as to direct the issuing fluid upwardly and, further, means are provided for vibrating the bush as it is subjected to the spray or fog of insecticide.

To that end, a suitable number of discharge pipes 5 are attached to the tank 2 and these extend rearwardly and angularly so that nozzles 6 on the ends of the pipes 5 will be disposed below the bush growth and adjacent to the stalks or stems S of the bushes B. Therefore, each pipe has at its end an upwardly turned nozzle 6 designed to pass below the bush growth. For the purpose of effectively vibrating the bushes the pipes have provided at their lower ends curved shoes 7 designed to swing in toward the stems of the bushes and engage the same during the travel of the vehicle V, upon which the tank is mounted, along the rows R of plants. The pipes 5 are designed to yield and thus protect the bushes against injury and, therefore, each pipe has a flexible connection 5' with its fitting 5ª connecting it to the tank.

Preferably, the apparatus involves a plurality of discharge pipes with their nozzles and in order to insure the effective coating of the bushes there is provided above each nozzle a hood which may consist of a semi-cylindrical member 8. As shown in Fig. 1, there is a hood and nozzle arranged on each side of the machine and one is also arranged at the rear end thereof, thus enabling the treatment of three rows along one path of travel of the machine.

As the vehicle is driven along, the outwardly extending and lower ends of the pipes 5 sweep the shoes 7 against the stems of the bushes and these are shaken as the atomized insecticide is discharged from the nozzle 6. The insecticide is, preferably, discharged in a finely divided condition simulating a fog under each of the hoods 7, thus insuring the effective subjecting of the bushes to the insecticide.

Various modifications and changes may be resorted to within the spirit of the invention as claimed.

What is claimed is:

In an insect destroyer, a wheeled supporting frame, a tank adapted to contain poisonous liquid carried on the frame, a shield supported by the frame above the level of the plants to be treated, an upwardly directed spray nozzle adapted to discharge spray upward toward said shield, and means for forcing the liquid in the tank outward through said spray nozzle.

In testimony whereof I have signed my name to this specification.

PINKNEY C. MATTOX.